United States Patent Office 3,114,765
Patented Dec. 17, 1963

3,114,765
PREPARATION OF α-CHLOROACRYLONITRILE
Keith M. Taylor, Dickinson, Tex., assignor to Monsanto
  Chemical Company, St. Louis, Mo., a corporation of
  Delaware
No Drawing.   Filed Mar. 15, 1961, Ser. No. 95,787
            3 Claims.  (Cl. 260—465.7)

The present invention relates to a method for the preparation of α-chloroacrylonitrile and, more particularly, it relates to a simple method for chlorinating acrylonitrile directly with chlorine.

α-Chloroacrylonitrile is a relatively new unsaturated organic chemical having extensive use in the formation of polymers and copolymers which in turn find application mostly in the field of synthetic fibers and films but which are useful also in the production of molded articles, adhesives, coatings, rubber substitutes, textile impregnants, etc.

α-Chloroacrylonitrile is not readily prepared. Direct chlorination of acrylonitrile in solution does not yield this compound but tends to produce instead β-chloropropionitrile and trichloropropionitrile. Substitutive chlorination is known to be effective in the vapor phase only in the presence of a catalyst such as activated carbon, for example, and even then the process is only about 40% effective in producing α-chloroacrylonitrile with β-chloropropionitrile and trichloropropionitrile also being produced.

It has now been discovered that α-chloroacrylonitrile can be produced in excellent yield in an uncatalyzed vapor-phase reaction of acrylonitrile directly with chlorine if the conditions of reaction are properly controlled. According to the process of the invention, this monochlorinated derivative of acrylonitrile is produced by passing acrylonitrile mixed with chlorine in mole proportions in the range from 1:1 to 3:1 through a reaction zone heated to a temperature in the range from about 450° C. to about 850° C. at a rate such that the residence time of the gases in the reaction zone is in the range from about 1 millisecond to about 1 second. The invention is illustrated in the following example, which, however, is not to be construed as limiting it in any manner whatsoever.

EXAMPLE I

A series of runs was made in which acrylonitrile was reacted in the vapor phase directly with chlorine. The reactor employed was a quartz tube 0.8 cm. in outside diameter and of a length selected to give the desired reaction time. Heat to the reactor was supplied by means of an electrical furnace and the reaction zone temperature was determined by means of a thermocouple inserted in a 3-mm. O.D. quartz tube centered in the reactor. Acrylonitrile was fed from a pressurized reservoir through a rotameter into an electrically heated vaporizer and then into a line where it was premixed with chlorine in the desired mole proportions and with approximately 50% by volume of nitrogen as a diluent. The mixed gases were passed through the heated reactor at a rate to give the desired average residence time in the reaction zone. The effluent gases were condensed by passing them consecutively through a series of brine-cooled condensers and several Dry Ice traps. Non-condensed gases were vented to the atmosphere. The condensed products were combined, weighed and then analyzed by means of a Perkin-Elmer model 154 gas chromatograph with a printing integrator. Results of these runs together with the conditions under which they were obtained are presented in Table I below.

Table I

| Run No. | Charged (Moles/hr.) | | Temp. (° C.) | Residence Time (Seconds) | $CH_2CHCN$ Conversion (Mole Percent) | |
|---|---|---|---|---|---|---|
| | $CH_2CHCN$ | $Cl_2$ | | | All Prod. | α-CAN [1] |
| 2 | 0.8 | 0.7 | 450 | 0.1 | 6.4 | 4.9 |
| 4 | 0.7 | 0.6 | 550 | 0.1 | 16.4 | 14.2 |
| 5 | 0.6 | 0.5 | 600 | 0.1 | 23.1 | 16.1 |
| 6 | 0.6 | 0.5 | 650 | 0.1 | 48.4 | 35.9 |
| 7 | 3.18 | 3.16 | 600 | 0.02 | 9.3 | 8.6 |
| 8 | 3.1 | 2.9 | 650 | 0.02 | 15.4 | 12.1 |
| 9 | 2.8 | 2.9 | 700 | 0.02 | 51.1 | 40.4 |
| 10 | 2.9 | 2.8 | 750 | 0.02 | 51.7 | 38.6 |
| 11 | 3.3 | 3.1 | 600 | 0.001 | 5.5 | 4.1 |
| 12 | 3.0 | 2.8 | 650 | 0.001 | 15.6 | 11.5 |
| 13 | 2.9 | 2.7 | 700 | 0.001 | 12.6 | 8.1 |
| 14 | 2.7 | 2.5 | 750 | 0.001 | 13.3 | 10.7 |
| 15 | 2.6 | 2.4 | 800 | 0.001 | 10.3 | 8.4 |

[1] α-Chloroacrylonitrile.

It is apparent from the foregoing data that excellent yields of α-chloroacrylonitrile can be obtained by the direct thermal chlorination of acrylonitrile. Little or no addition chlorination products are produced using the process of the invention and the reaction product obtained is a clear, water-white liquid.

Some variation in conditions from those given in the example can be made without departing from the scope of the invention. The reaction can be conducted, for example, at temperatures within the range from about 450° C. to about 850° C., although operation of the process is preferably carried out at temperatures from about 600° C. to about 750° C.

While the reaction is preferably carried out with equimolar proportions of acrylonitrile and chlorine, the nitrile may be maintained in excess if desired and mole proportions of acrylonitrile to chlorine of 1:1 to 3:1 can be employed. There appears to be no advantage in employing chlorine in any excess. In fact, excess chlorine is to be avoided since when it is present additive chlorination across the double bond can occur.

Likewise, while residence times from about 20 to about 100 milliseconds provide for optimum conversions and yields, residence times anywhere from 1 millisecond to 1 second are suitable for the reaction. A diluent gas is desirable in the reaction but not essential. The heated diluent aids in feeding vaporized acrylonitrile and is advantageous in avoiding condensation between the vaporizer and the reactor. Inert gases other than the nitrogen exemplified which are suitable for this purpose include argon, helium, carbon dioxide and the like.

What is claimed is:

1. A process for the production of α-chloroacrylonitrile which consists in reacting acrylonitrile and chlorine in mole proportions in the range from about 1:1 to about 3:1 in the presence of an inert diluent gas in a reaction zone heated to a temperature in the range from about 450° C. to about 850° C., the residence time of the reacting gas mixture in the reaction zone being maintained within the range from about 1 millisecond to about 1 second.

2. A process for the production of α-chloroacrylonitrile which consists in reacting acrylonitrile and chlorine in equimolar proportions in the presence of an inert diluent gas in a reaction zone heated to a temperature within the range from about 600° C. to about 750° C., the residence time of the reacting gas mixture in the reaction zone being maintained within the range from about 20 to about 100 milliseconds.

3. A process for the production of α-chloroacrylonitrile which consists in passing equimolar proportions of acrylonitrile and chlorine admixed with about 50% by volume of said reactants of an inert diluent gas through a reaction zone heated to a temperature from about 700° C. to about 750° C. at a rate such that the residence time of said gas mixture in said reaction zone is about 20 milliseconds.

References Cited in the file of this patent
UNITED STATES PATENTS

| | | |
|---|---|---|
| 2,231,363 | Long | Feb. 11, 1941 |
| 2,466,641 | Hearne et al. | Apr. 5, 1949 |